US011987145B2

(12) United States Patent
Balali et al.

(10) Patent No.: US 11,987,145 B2
(45) Date of Patent: May 21, 2024

(54) FLEET ELECTRIFICATION MANAGEMENT

(71) Applicant: Volta Charging, LLC, San Francisco, CA (US)

(72) Inventors: Mohammad Balali, San Francisco, CA (US); David J. Klein, San Francisco, CA (US); Anna Bailey, San Francisco, CA (US); Brian Bowen, San Francisco, CA (US); Silas M. Toms, San Francisco, CA (US); Praveen Mandal, San Francisco, CA (US)

(73) Assignee: VOLTA CHARGING, LLC, San Francisco, CA (US)

( * ) Notice: Subject to any disclaimer, the term of this patent is extended or adjusted under 35 U.S.C. 154(b) by 59 days.

(21) Appl. No.: 17/932,631

(22) Filed: Sep. 15, 2022

(65) Prior Publication Data

US 2023/0045381 A1    Feb. 9, 2023

Related U.S. Application Data

(63) Continuation of application No. 17/882,481, filed on Aug. 5, 2022.

(Continued)

(51) Int. Cl.
*H02J 7/00*         (2006.01)
*B60L 53/30*        (2019.01)
(Continued)

(52) U.S. Cl.
CPC ............ *B60L 53/63* (2019.02); *B60L 53/305* (2019.02); *B60L 53/64* (2019.02); *B60L 53/67* (2019.02)

(58) Field of Classification Search
CPC .......... B60L 53/63; B60L 53/67; B60L 53/74; B60L 53/305

(Continued)

(56) References Cited

U.S. PATENT DOCUMENTS

| 10,889,196 B2 * | 1/2021 | Michels ............... B60L 53/665 |
| 2015/0039391 A1 * | 2/2015 | Hershkovitz ...... G06Q 30/0202 705/7.31 |

(Continued)

FOREIGN PATENT DOCUMENTS

| CN | 110659794 A * | 1/2020 | ....... G06Q 10/06315 |
| CN | 110659794 A | 1/2020 | |

OTHER PUBLICATIONS

Kley, Fabian, et al., "New Business Models for Electric Cars—A Holistic Approach", Energy Policy, Elsevier, Amsterdam, NL, vol. 39, No. 6, pp. 3392-3403, Mar. 15, 2011, 12 pages.

(Continued)

*Primary Examiner* — Alexis B Pacheco
(74) *Attorney, Agent, or Firm* — Hickman Becker Bingham Ledesma LLP

(57) ABSTRACT

Techniques are described herein for fleet electrification management. A method includes determining a composition of electric vehicles (EVs) to replace at least a portion of non-electric vehicles in a vehicle fleet while satisfying travel requirements of the vehicle fleet. The method includes estimating an energy demand of the composition of EVs. The method includes determining an electric vehicle supply equipment (EVSE) charging infrastructure to meet the estimated energy demand. The method includes providing one or more recommendations including at least one of: a fleet electrification recommendation for transitioning the vehicle fleet into the composition of EVs, or a charging infrastructure recommendation for implementing the EVSE charging infrastructure.

20 Claims, 12 Drawing Sheets

Related U.S. Application Data

(60) Provisional application No. 63/229,869, filed on Aug. 5, 2021.

(51) Int. Cl.
  *B60L 53/63*  (2019.01)
  *B60L 53/64*  (2019.01)
  *B60L 53/67*  (2019.01)
  *H02J 7/14*   (2006.01)

(58) Field of Classification Search
  USPC .................................................... 320/109
  See application file for complete search history.

(56) References Cited

U.S. PATENT DOCUMENTS

| | | | |
|---|---|---|---|
| 2017/0043671 A1* | 2/2017 | Campbell | G08G 1/0129 |
| 2019/0178678 A1* | 6/2019 | Rahbari Asr | B60L 53/66 |
| 2021/0194267 A1* | 6/2021 | Shin | H01M 10/486 |

OTHER PUBLICATIONS

International Searcing Authority, Search Report, in International Application No. PCT/US2022/039636, dated Nov. 11, 2022, 12 pages.

Current Claims, in International Application No. PCT/US2022/039636, dated Nov. 11, 2022, 4 pages.

* cited by examiner

FIG. 4A

| Vehicle | Vehicle type | Type | Fuel savings | CO2 savings (tons) | Total costs | Maintenance costs | Energy costs | Range (miles) | |
|---|---|---|---|---|---|---|---|---|---|
| 2019 Ford Fusion | Sedan/Wagon | Existing | — | — | $27,840 | $4,285 | $2,465 | — | View |
| 2016 Ford F-150 | Truck | Existing | — | — | $27,705 | $2,670 | $1,850 | — | View |

| Vehicle | Vehicle type | Type | Fuel savings | CO2 savings (tons) | Total costs | Maintenance costs | Energy costs | Range (miles) | |
|---|---|---|---|---|---|---|---|---|---|
| 2022 Nissan LEAF | Hatchback | Recommended | $1,771 | 292 | $27,400 | $1,976 | $494 | 149 | View |
| 2022 Rivian R1T | Truck | Recommended | $988 | 265 | $67,500 | $1,339 | $868 | 314 | View |

FIG. 4B

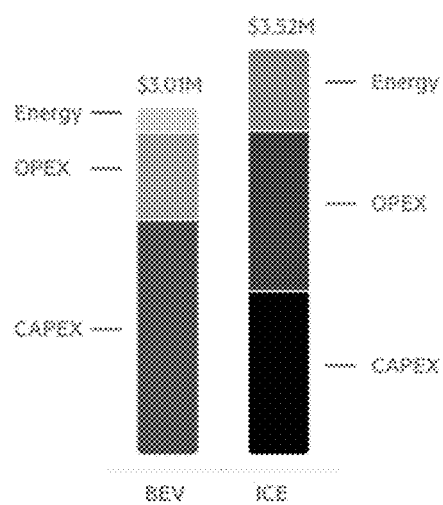

FIG. 4C

EVSE & Infrastructure costs
What electric vehicle supply equipment (EVSE) is required to electrify the fleet?

Level 2, 7 KW, Single Port

| EVSE | Usage | EVSE & Infrastructure costs | O&M costs |
|---|---|---|---|
| 60 | 518,284 kWh | $392,482 | $1,500 |
| View details | Yearly | One time | Yearly |

| Peak load | Max Total Daily Usage | Dwell time | Peak time |
|---|---|---|---|
| 378.6 kW | 1993.4 kWh | 610 hours | 8:00 pm |

| Est. daily energy cost | % of day used |
|---|---|
| $167 | 42.36% |

FLEET ELECTRIFICATION MANAGEMENT

CROSS-REFERENCE TO RELATED APPLICATIONS; BENEFIT CLAIM

This application claims the benefit under 35 U.S.C. § 120 as a continuation of application Ser. No. 17/882,481 filed Aug. 5, 2022, which claims the benefit of Provisional Application 63/229,869, filed Aug. 5, 2021, the entire contents of which is hereby incorporated by reference as if fully set forth herein, under 35 U.S.C. § 119(e).

FIELD OF THE INVENTION

The present invention relates to electrification of fleet vehicles, charging station infrastructure, charging scheduling, energy cost, power distribution and clean energy integration.

BACKGROUND

The fleet sector has recently accounted for one of the largest portions of global greenhouse gas emissions. Thus, numerous opportunities exist to create more cleaner and cost-effective energy future by electrifying medium and heavy-duty fleets. Increasing Electric Vehicle (EVs) adoption trends, technological improvements in EV production and Electric Vehicle Supply Equipment (EVSE) infrastructure along with emission reduction legislation and incentives have motivated fleet operators to embrace electrification of their vehicles in earnest. Manufactures have already expanded their production lines to supply fleet-ready EVs for fleet vehicles.

Recent technological development of EVSEs and their capability to integrate into the electrical distribution network ensures that fleet operators are able to meet their required energy demand. In addition to hardware development, various Artificial Intelligence (AI) algorithms have been designed or implemented to efficiently manage and monitor each step of the fleet electrification process. These data-driven algorithms can communicate with energy providers and consumers to seamlessly meet the electrical demands while considering several applications to curtail the peak of energy usage, reduce energy bills, and improve the stability of the grid. Companies have already started to assess their needs to determine an optimized electrification strategy to enhance their operations. Therefore, a comprehensive fleet electrification management strategy is needed to recommend an optimized composition of the fleet vehicles, estimate energy needs, identify the right charging equipment, and optimized charging recommendations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4A is a diagram illustrating example compositions of an existing vehicle fleet and a recommended electrified vehicle fleet with EVs replacing non-EV (including hybrid) or ICE vehicles;

FIG. 4B is a diagram presenting an example Total Cost of Ownership (TCO) analysis broken down into Energy, Operation Expenditure (OPEX), and Capital Expenditure (CAPEX);

FIG. 4C is a diagram illustrating an example EVSE infrastructure recommendation;

DETAILED DESCRIPTION

Figure 1:
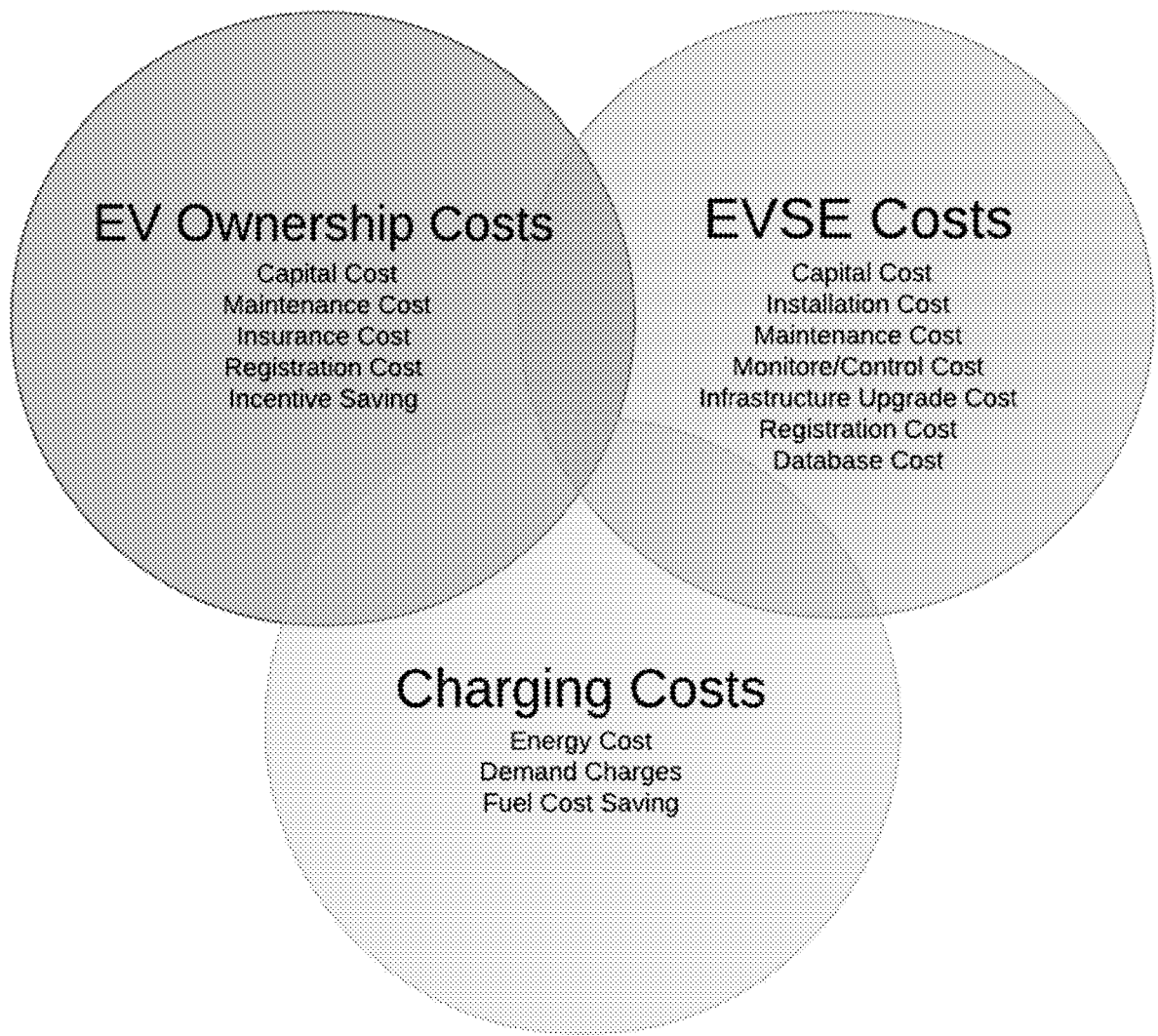
FIG. 1 is a Venn diagram illustrating significant costs of fleet electrification.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for fleet electrification management. An algorithm is proposed that assists with optimal electrification strategies over a desired electrification period while minimizing total costs, which may include ownership, maintenance, insurance, registration, and charging costs as well as incentives and rebates. The proposed algorithm first determines an optimized mix of EVs to replace a portion or all existing non-EV (including hybrid) or Internal Combustion Engine (ICE) vehicles in a vehicle fleet. Customer electrification budget, preferred adoption time, interest in specific vehicle brands and models, EV market availability and inventory are all adjustable parameters for providing optimal electrification recommendations.

The main inputs to the algorithm include the 1) current mix of the fleet, 2) expected travel shifts information such as average and maximum distance travel for a defined period (such as per weekday or weekend), operation times, and daily dwell times, 3) desired electrification period, and 4) annual budget constraints for electrification and charging infrastructure. Once the recommendations are provided, a user may adjust the scenarios to reflect any specific interest in vehicle brand and model, or modify any of the parameter values, such as Manufacturer Suggested Retail Price (MSRP) and rebates, considered in the optimization model. Consequently, optimal electrification recommendations provide strategies with minimum cost based on the all the constraints defined by user or enforced by the EV market.

In a next step, the optimized charging schedule of each EV is determined based on the required energy demand for each travel shift, time-varying electricity price profile, and practical charging window, in which EVs are available to be charged. The required energy demand for the recommended fleet mix is estimated based on trip distance information, delivered miles per kWh of electricity, efficiency of EVs batteries, and an application multiplier which include the effect of a vehicle application on the energy consumption of the vehicles. For instance, a same vehicle might have higher miles per kilowatt hour once there is no load in the vehicle compared with the case that heavy items are loaded in the vehicle. The main objective of this model is to provide optimal charging rates in order to minimize the total energy cost, while ensuring that all the EVs have their required energy before starting their next travel shift. A decentralized quadratic optimization problem is formulated to let each EV communicate with the centralized controller for determining the optimized power rates based on energy cost and travel shift requirements.

Once the hourly power demand of a week is determined, an optimized mix of charging infrastructure is recommended based on vehicles charging time and power. It should be noted that chargers' return on investment will be higher by following the recommended charging schedules. To buffer the dependency of the charger recommendation on the determined charging schedule, a rate of change in the peak energy demand, which can be caused due to changes in the travel shift, may be considered in the charging infrastructure optimization problem. In the last step, charging solutions at the EV level can be modified based on the allowed range of changes to the required energy for each travel shift and the capacity of the recommended EVSEs.

The proposed algorithm is capable of considering various applications such as peak shaving, demand response, frequency regulations, etc. Furthermore, Energy Storage Systems (ESSs), such as batteries and fuel cells, and Renewable Energy Resources (RERs), such as solar Photovoltaics (PV) panels and wind turbines, can be integrated into the framework of the proposed algorithm to enhance the stability of the grid and provide cleaner and cost-effective sources of energy. The proposed algorithm provides a helpful tool for fleet, distribution services and utility operators to provide a stable, clean, and cost-effective supply of power to EV fleets.

The proposed algorithm is an optimization problem for a novel formulated fleet electrification problem. It includes three main sub-problem as 1) fleet electrification, 2) charging solution, and 3) charging infrastructure, which each will be discussed in detail in the following sections.

Definitions

Indexes:
k: EV Type
t: Time
j: Charging Station Type
m: Selected EV for Fleet
t: long—term time horizon for electrification τ: short—term time horizon for charging scheduling
Decision Variables:
$N_{k,t}^{EVL}$: Number of Leased EV type k at time t
$N_{k,t}^{EVF}$: Number of Financed EV type k at time t
$N_j^{Station}$: Number of Charging Station type j
$P_m(\tau)$: Power rate of EV id m at time slot
Nomenclature:
T: Total Electrification Period
$C_k^{Lease}$: Fixed Cost of Leasing EV type k
$C_k^{Finance}$: Fixed Cost of Financing Cost EV type k
$i_k$: Incentive of EV type k
$\delta_k$: insurance and registration for EV type k
$D_k$: Expected Mean Distance Traveled for EV type k
$M_k^{Lease}$: Maintenance cost for Leased EV type k
$M_k^{Finance}$: Maintenance cost for Financed EV type k
N: Total number of required fleet vehicles
$C_j^{Station}$: Capital Cost of Charging Station type j
$M_j^{Station}$: Maintenance Cost of Charging Station type j
α: Electrification Adaptation Rate
$TC^{EVL}$: Total Cost of Leasing EV
$TC^{EVF}$: Total Cost of Financing EV
$TC^{EVSE}$: Total Cost of Installing EV Supply Equipment
$TC^{CHARGE}$: Total Cost of Charging EVs
$TR^{ICE}$: Total Revenue of Selling ICE Vehicles
$TC^{FEUL}$: Total Fuel Cost of Sold ICE Vehicles
$N_{k,t}^{EVL}$: Number of Leased type k EV at time t
$N_{k,t}^{EVF}$: Number of Financed type k EV at time t
$N_{i,t}^{ICE}$: Number of Sold ICE type i Vehicle at time t
$B_t$: Available Budget at time t
$I_{k,t}^{EVF}$: Expected Market Inventory level of EV type k at time t for finance
$I_{k,t}^{EVL}$: Expected Market Inventory level of EV type k at time t for lease $$EPM_k = \text{Energy Per Mile} \left(\frac{kWh}{Mile}\right)$$

$E_k$: Required Energy for EV type k
E: Total Required Average Energy for Fleet
$T_{dwell}$: EVs Dwell Time
β: Percentage of EVs availability During Dwell Time
F: Optimization objective function
$P_{base}(\tau)$: Base Power rate at time slot τ
P: Charging profiles for all EVs
$P_m$: Required power for EV id m
$P_m^{max}$: Maximum power rate for EV id m
$P_\tau^{max}$: Maximum allowable power drain based on the feeder capacity at time τ
$P_m^{charger}$: Power of the charger that charges EV id m
δ: Penalty for deviation from average power consumption
L(P): Total load profiles for all EVs and required base load
C(L(P)): Total electricity price for the total load profiles
$e(L_\tau(P))$: Electricity price for the total load profiles at time τ
$\tau_m^{start}$: Start time of practical charging window for EV id m
$\tau_m^{end}$: End time of practical charging window for EV id m
$B_m$: Battery Capacity of EV id m
$\eta_{B_m}$: Battery efficiency of EV id m
$SOC_m(\tau)$: State of Charge of the Battery of $m^{th}$ EV at time τ
$SOC_m^{min}$: Minimum State of Charge of the Battery of EV id m to Start Charging Session

Fleet Electrification Management Algorithm

One objective of a fleet electrification management ("PredictEV Fleet") algorithm is to electrify a portion or all of a current fleet while minimizing the total costs. As FIG. 1 presents, total cost can be broken down into EV ownership, EVSE infrastructure, and charging costs.

The PredictEV Fleet algorithm first determines an optimized mix of EVs to replace a portion or all of existing non-EV or Internal Combustion Engine (ICE) vehicles over the planning horizon. Customer electrification budget, preferred adoption time, interest in specific vehicle brands and models, EV market availability and inventory will all be considered for providing optimal electrification recommendation.

Figure 2:
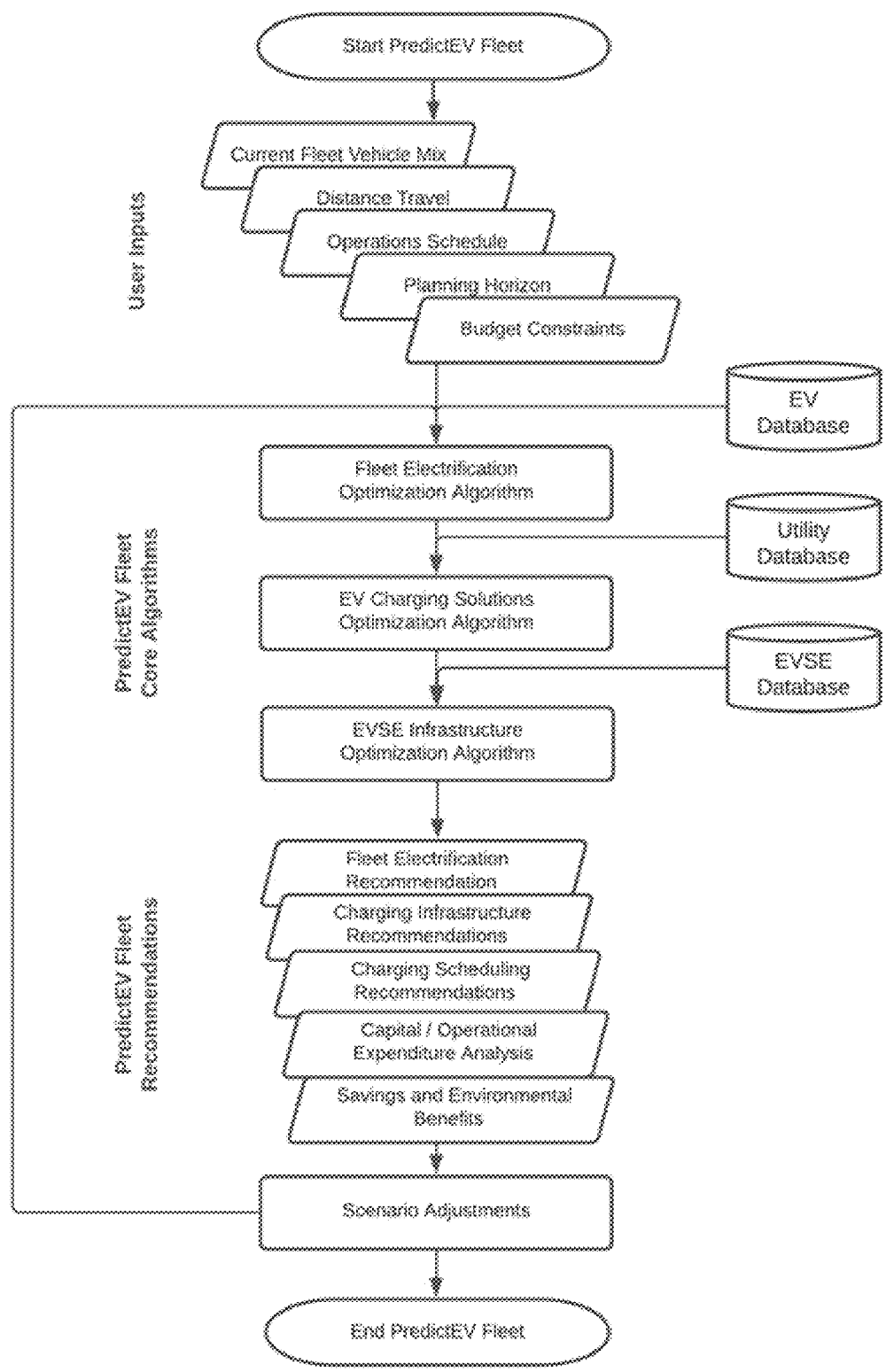
FIG. 2 is a flowchart illustrating steps to perform fleet electrification management ("PredictEV Fleet"), according to an embodiment.

FIG. 2 presents an overview of a fleet electrification management ("PredictEV Fleet") algorithm.

PredictEV Fleet algorithm provides recommendations based on scenarios defined by users. The main inputs to the algorithm are the current mix of the fleet, electrification planning horizon, operations time or shift information, available dwell time which fleet yard is available for charging vehicles, and electrification and charging infrastructure capital constraints. User inputs are integrated with EV database information to provide recommendations for electrifying the fleet vehicles based on an optimized electrification strategy. The recommended vehicles are the same class of ICE vehicles which are currently exist in the fleet. The Vehicle Identification Number (VIN) look up feature is also embedded in the PredictEV Fleet for obtaining the most accurate information of the existing vehicles.

In the next step, the required energy demand for the recommended fleet mix is estimated based on the required energy demand and practical charging window. These initial energy estimations are considered as a feasible start solution for the main charging schedule optimization problem. Consequently, the optimization problem will have a warm start and is expected to converge to the global optimum point. Once the optimal charging schedule of each EV is determined, the peak period of energy demand is estimated based on the peak of the charging demand during the practical charging window, in which EVs are available to be charged.

In the last step of the main optimization problem, the optimized charging infrastructure will be recommended to satisfy the obtained charging schedules. It should be noted that the recommended charging infrastructure is able to supply the required power for the periods with peak demands in addition to any required reserved or back-up power to let the charging infrastructure meet the energy demand within a certain amount of deviation from the optimized charging schedule. This eliminates unnecessary infrastructure upgrades. Once the recommendations are provided, scenario planning can be defined based on different input variables or parameters that have been used during the optimization problem. For instance, a user might have different opinion of the maintenance cost of a specific EV than what exists in the EV database. The scenario planning feature will trigger the main optimization problem to reconsider all the recommendations based on the modified values.

The proposed algorithm is capable to consider various applications such as peak shaving, demand response, frequency regulations, etc. Indeed, charge schedule optimization problem seeks to minimize the peak of the energy and communicates with the Utility and Distributed Service Operators (DSOs) to consider any restrictions or requests from energy providers. This communication can be in form of energy price and cap signals. The core charge schedule optimization problem will recommend one-time charging schedule recommendation based on the baseline for energy cost and cap. Further adjustments can be considered to make the PredictEV Fleet tool an online planning tool for real-time charging schedules of the EVs.

The developed algorithm is capable to integrate Energy Storage Systems (ESSs) and Renewable Energy Resources (RERs) installed at a fleet yard to enhance the stability of the grid and provide cleaner and cost-effective sources of energy. In the case of ESSs and RERs, the charging schedule optimization problem will receive additional signals from ESSs and RERs. In other words, a sub-optimization problem is integrated into the main optimization problem for performing the Unit Commitment to determine the optimal amount of power drain from each source at each time interval. The details of the proposed algorithms are further discussed herein.

Fleet Electric Vehicles Composition

One objective of the PredictEV Fleet algorithm is to electrify the current fleet while minimizing cost and providing socio and economic benefits. On the other hand, the fleet electrification process is not only limited to replacing ICE vehicles with EVs. It needs an accurate analysis to study the charging infrastructures and provide optimized recommendations regarding EVSE installation, infrastructure upgrade, and charging solutions. The PredictEV Fleet algorithm provides EVSE installation, infrastructure upgrade, and charging solution recommendations based on the suggested number of EVs. The recommendations may be tailored for each specific application. Therefore, the EV fleet composition step is the base step of the PredictEV Fleet algorithm shown in FIG. 2.

Electric vehicle fleet composition seeks to minimize the total cost of ownership, either lease or finance, and total cost of charge. Fuel costs for the remaining ICE vehicles in the fleet and obtaining revenue of selling or retiring ICE vehicles are assumed to be the same for all EV options. Consequently, there is no need to include such variables in the objective function since they act as constant values.

Each EV delivers different miles per kilowatt-hour of energy based on the battery and vehicle specification. It indicates charging cost, or dollars per kilowatt-hour of energy, and is an important factor for recommending the electrification plans. On the other hand, the average cost of electricity is also considered since it will be the same value for all models of EVs. Therefore, the objective function in Equation (1) below seeks to minimize the total cost of ownership and charge over the optimization horizon T. Equations (1.a) and (1.b) present the total lease and finance cost for $N_{k,t}^{EVL}$ and $N_{k,t}^{EVF}$ number of leased and financed EV type k at time t. Ownership costs include lease or finance charges, incentives, insurance, registration, and maintenance costs. It should be considered that maintenance cost depends on the traveled miles. Equation (1.c) states the total cost of charge based on the average price of electricity and total required kilowatt-hour of energy. Indeed, the total required kilowatt-hour of energy is the only variable criterion among all the EV models. Consequently, considering the average price of electricity, rather than a variable electricity price profile, does not change the optimal mix of the EVs. This indicates that energy price is independent from the model of EVs and energy bills are issued based on the maximum consumed power and energy profile.

It has been assumed that the application of the EV or ICE vehicle will remain the same. This indicates that the total number of retired ICE vehicles must be equal to the total number of adopted EVs. Equation (1.d) shows the balance between the EV adoption and ICE retirement, while a is the electrification adoption rate. The electrification adoption rate is a variable over the planning years. The electrification optimization problem seeks to electrify the maximum portion of the ICE vehicles with respect to the defined constraints either by user, in terms of budget, or by market. This constraint can be easily released if the user can input the desired number of EVs.

Minimize $TC^{EVL} + TC^{EVF} + TC^{CHARGE}$ (1)

$$TC^{EVL} = \Sigma_{t=1}^{T}\Sigma_{k=1}^{K} N_{k,t}^{EVL}(C_k^{Lease} + D_k \cdot M_k^{Lease} - i_k + \delta_k)$$ (1.a)

$$TC^{EVF} = \Sigma_{t=1}^{T}\Sigma_{k=1}^{K}(C_k^{Finance} + D_k \cdot M_k^{Finance} - i_k + \delta_k)$$ (1.b)

$$TC^{CHARGE} = \Sigma_{t=1}^{T}\Sigma_{k=1}^{K}(N_{k,t}^{EVL} + N_{k,t}^{EVF})(D_k \cdot EPM_k)$$
$$(\overline{C}^{Electricity})$$ (1.c)

$$\Sigma_{t=1}^{T}\Sigma_{k=1}^{K} N_{k,t}^{EVL} + N_{k,t}^{EVF} = \alpha N$$ (1.d)

The PredictEV Fleet algorithm may output to adopt the entire number of required EVs at the current time if there is no limiting constraint such as required budget or EVSE infrastructure. Intuitively, if all the resources are available to obtain a specific number EVs now, there is no motivation to postpone this decision into the future. It may be assumed that the required budget for the fleet electrification process becomes available gradually, as Equation (1.e) presents. Equation (1.f) denotes that number of leased and financed EV type k at time t must be certainly a positive integer value. PredictEV Fleet tool has the access to the designed EV Database to obtain the most recent information regarding the different characteristics of each EV model.

$$\Sigma_{k=1}^{K}(N_{k,t}^{EVL} \cdot C_k^{Lease} + N_{k,t}^{EVF} \cdot C_k^{Finance}) \leq B_t \forall t$$ (1.e)

$$N_{k,t}^{EVL}, N_{k,t}^{EVF} \in \{\mathbb{Z}_+ (\text{positive integer})\} \forall k,t$$ (1.f)

In addition to budget constraints, available inventory of the vehicles might be also a limiting factor. This indicates the external constraints forced by market fluctuations should be captured in the electrification optimization problem. Equations (1.g) and (1.h) represent the expected inventory constraints for both lease and finance options.

$$N_{k,t}^{EVL} \leq I_{k,t}^{EVL} \forall k,t$$ (1.g)

$$N_{k,t}^{EVF} \leq I_{k,t}^{EVF} \forall k,t$$ (1.h)

It should be noted that electrification rate is a dynamic parameter which starts from 100% electrification at each year and will be gradually reduced until a feasible solution is reached. The remaining vehicles will be carried over the electrification horizon until the budget or inventory constraints allow. There is possibility that a portion of vehicles remains unelectrified at the end of the planning horizon. This indicates, based on the considered limitations, that all the fleet vehicles cannot be electrified within the defined planning horizon. Releasing some of the constraints or improving budget limitations might accelerate the electrification process. It has been assumed that market inventory is an external factor which users do not have any control over.

Thus, using the PredictEV Fleet EV Composition Algorithm to solve the EV composition sub-problem provides recommendations on the optimized number, type of EV, and adoption time to replace the current fleet mix. The optimization problem relies on the user inputs and EV database information.

Energy Demand

Required average power demand (kW) can be estimated based on the estimated number of EVs, determined by the FleetEV Composition Algorithm step, and operation times of each shift. A practical charging window is a portion of the remaining time between consecutive shifts in which EVs are available to be charged. For instance, fleet operations may end at 8:00 PM and start at 4:00 AM but, two hours is required to load the packages into the trucks. Therefore, the practical charging time is six hours.

Figure 3A:
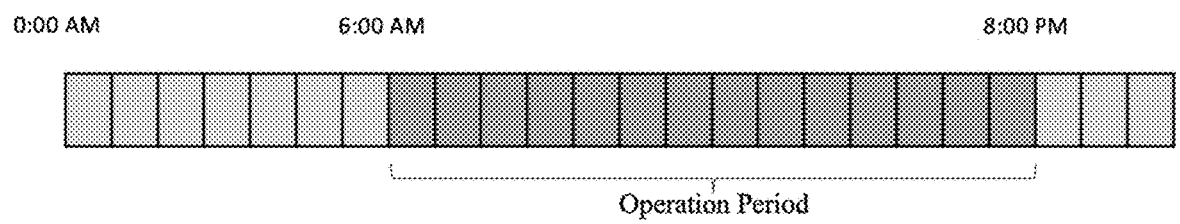
FIG. 3A is a diagram illustrating an example hourly charging horizon and practical charging window.

In addition, practical charging time considers the operational hours of the fleet yard as well. This will be very critical for the scenarios which need plugging and unplugging EVs outside of the operation hours which fleet operators are unavailable. It should be noted that EVs might remain plugged into the stations over night or between the shifts. In other words, practical charging time enforces the presence of an operator for plugging and unplugging vehicles as needed. An example of hourly charging horizon and practical charging window is presented in FIG. 3A.

In the first step of the energy demand estimation algorithm, the required energy should be estimated at EV level based on the maximum distance traveled (miles) and energy usage per mile (kWh/mile) separately for each shift. Equation (2) present the required energy for each EV type k. It should be noted that the required energy and distance traveled are both based on the same unit of time.

$$E_k = D_k * EPM_k$$ (2)

Figure 3B:
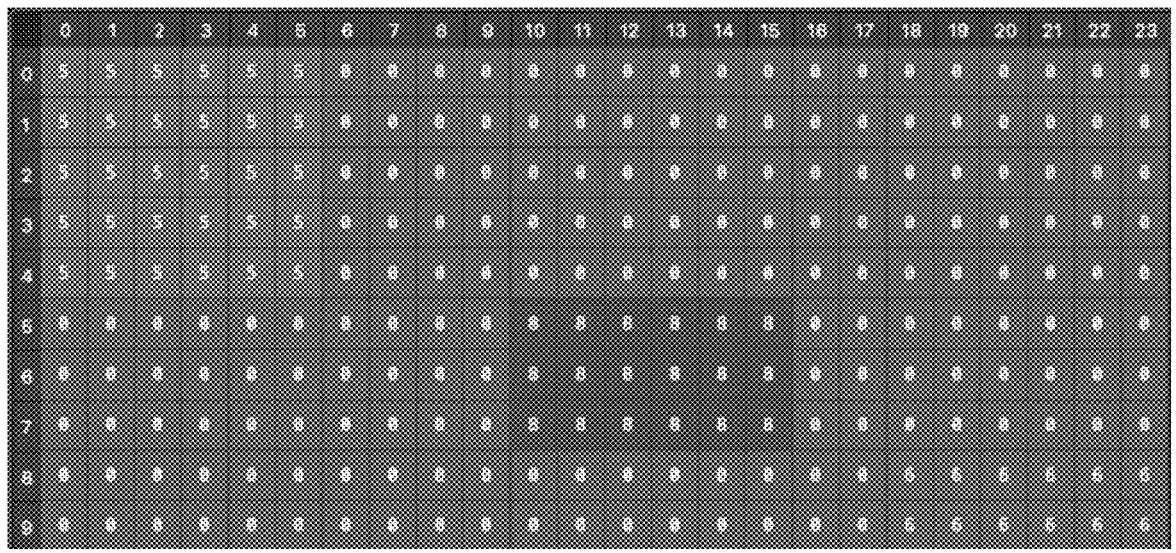
FIG. 3B is a diagram illustrating an energy demand estimation to initialize an example charging schedule optimization problem (warm start)

FIG. 3B presents an example of energy demand estimation to initialize the charging schedule optimization problem. Rows are representing EV ids, and columns are representing hours of a day. The following are the details of this example:

EV id 0 to 4 requires 30 kWh and are available from 0:00 AM to 6:00 AM

EV id 5 to 7 requires 48 kWh and are available from 10:00 AM to 4:00 PM

EV id 8 to 9 requires 36 kWh and are available from 06:00 PM to 0:00 AM

This estimation of the energy demand significantly helps the optimization problem to converge faster to the global optimum point by starting from a feasible but not optimum point.

The total required energy for all EVs can be calculated as Equation (3) presents.

$$E = \Sigma_{k=1}^{K}(N_{k,T}^{EVL} + N_{k,T}^{EVF}) \cdot E_k$$ (3)

It is expected to use the maximum practical charging time to reduce cost since fast charging is more expensive due to the higher power demand on the grid. Consequently, uniformly distributing energy demand over the practical charging window seems a reasonable feasible start point for the optimization problem. In other word, this solution might relatively have low peak charges. The total required average power is calculated based on the availability of the EVs for charging during the practical charging window. Back-up power and overhead time for any activities other than charging during the practical charging window can be considered in this step. Equation 4 shows the required total average power, $\overline{P}$, based on EVs dwell time, $T_{dwell}$, and percentage of their availability, during the dwell time at the fleet yard.

$$\overline{P} = E * \frac{1}{T_{dwell} \cdot \beta}$$ (4)

Fleets may have multiple charging windows per day, depending on operation and dwell times of EVS. In real-world applications, different load profiles may exist when not all EVs can be charged during the same period or at the same rate. For the EVSEs infrastructure recommendations, the peak of the total average power is required to be considered. For those scenarios, the required total average power is calculated based on the overlap between the charging sessions. Once the optimal powers rates are obtained, the highest required charging rate, peak power, defines the minimum required amount of power that should be considered in the EVSEs infrastructure recommendations. For the examples shown herein, it has been assumed that all EVs are available for the same charging window. Therefore, a constant power demand during the charging window is required.

It should be noted that the PredictEV Fleet tool has the capability to expand for the scenarios in which fleet vehicles are not returning to the same fleet yard. In those cases, optimized location of the EVSEs will be recommended based on the route, power availability and fleet strategies.

Offline Charging Schedules

The PredictEV Fleet tool includes an algorithm to address a scheduling sub-problem by determining the optimum power rates and charging schedules of each EV based on the average energy price profile to minimize the total cost of charging all EVs, M, through practical charging horizon, H, using N numbers of available charging stations, which will be determined in the Electric Vehicle Supply Equipment section.

The ideal solution minimizes electricity generation costs by scheduling EVs' energy demand to fill the overall energy demand "valley". The formulated charging schedule problem, as a sub-problem for PredictEV Fleet, will be optimized by using a decentralized charging control schema developed by 1) Zhongjing Ma, Duncan S. Callaway, and Ian A. Hiskens and 2) Lingwen Gan, Ufuk Topcu, and Steven H. Low. The method is useful in applications where fully centralized control is not possible, but where optimal or near-optimal charging patterns are essential to system operation.

Consider a scenario where a utility company negotiates with EVs to schedule their charging profiles over time slots. The utility is assumed to know (precisely predict) the inelastic base load (aggregate non-EV load) profile and aims to flatten the total load (base load plus aggregate EV load) profile by shaping the aggregate EV load.

The formulated problem lets each individual EV to determine their own charging pattern. Vehicle charging decisions are made based on availability of the EVs and time-varying electricity price profile. Each EV can charge after it plugs in and needs to charge a pre-specified amount of electricity, defined by the operations information, by its deadline. For instance, an EV may plug in for charging at 9:00 pm, specifying that it needs to reach at least 80% state of charge (SoC) by 6:00 am.

At each time slot, the charging rate of each EV, $P_m(\tau)$, is assumed to be a constant value. For instance, if time slots are 5 minutes, power rate is assumed to remain same from 9:00 AM to 9:05 AM for EV id m at time slot T. $P_m$: $(P_m(1), P_m(2), \ldots, P_m(\Gamma))$ denotes the charging profile of EV m for $\tau \in \Gamma$ and $m \in M$.

P denotes the charging profiles for all EVs. P: $(P_1, \ldots, P_M)$.

$P_{base}(\tau)$ represent the base load of the site at time slot $\tau$. This indicates all the non-EV loads.

Equation (5) indicates the total EV and non-EV energy demand over the planning horizon. If the main purpose of the problem is just flattening the power profile, rather than energy cost, L(P) can be considered as the main objective function for the charging scheduling optimization problem.

$$L(P)=(P_1,\ldots,P_M)=\Sigma_{\tau\in\Gamma}(P_{base}(\tau)+\Sigma_{m\in M}P_m(\tau)) \quad (5)$$

Total energy cost can be captured by minimizing the total cost for the total EV and non-EV energy demand over the planning horizon, while F, C(L(P)) and $e(L_\tau(P))$ are optimization objective function, total energy cost and time-varying electricity prices, respectively.

$$F=C(L(P))=\Sigma_{\tau\in\Gamma}e(L_T(P))(P_{base}(\tau)+\Sigma_{m\in M}P_m(\tau))$$

A local optimization function, $F_m$, can be defined for each EV.

$$F_m=\Sigma_{\tau\in\Gamma}e(L_\tau(P_m))\cdot P_m(\tau)$$

To apply both energy cost optimization and valley-filling strategies, another term can be added to the local objective function of each EV to penalize the deviation from the overall average power at time $\tau$, $\overline{P}(\tau)$.

$$F_m=\Sigma_{\tau\in\Gamma}e(L_\tau(P_m))\cdot P_m(\tau)+\delta(P_m(\tau)-\overline{P}(\tau))^2$$

Each EV can receive power during its practical charging window, $[\tau_m^{start}, \tau_m^{end}]$, for which the EV is available for charging.

$$P_m(\tau) = \begin{cases} 0 \leq P_m(\tau) \leq P_m^{max} & \text{if } \tau \in \left[\tau_m^{start}, \tau_m^{end}\right] \\ 0 & \text{otherwise} \end{cases}$$

There might be a cap on power drain from the feeder or power line, $P_\tau^{max}$, at each point of time. This can represent the energy providers' restrictions or power line capacity.

$$(P_{base}(\tau)+\Sigma_{m\in M}P_m(\tau))\leq P_\tau^{max} \forall \tau\in\Gamma$$

Total required power for each EV can be defined based on the required SoC at time of departure, SoC at time of arrival, and efficiency of the battery. It should be noted that SoC departure and arrival can be estimated based on the travel distance information of each trip. $B_m$, $\eta_{B_m}$, $SoC(\Gamma)$, $SoC(0)$, and $\Delta\Gamma$ represent battery capacity, battery efficiency, SoC at departure, SoC at arrival, and duration of charge.

$$P_m = \frac{B_m(SoC_m(\Gamma) - SoC_m(0))}{\eta_{B_m}\cdot\Delta\Gamma}$$

Equation (6) indicates that each EV should receive the required total power during the practical charging window.

$$\Sigma_{\tau\in\Gamma}P_m(\tau)=P_m \forall m\in M \quad (6)$$

The outcome of the developed decentralized approach will be confirmed by a centralized controller, which oversees communication with utilities and energy providers. The decentralized algorithm determines the local charging patterns of each EV. Care must be taken to ensure charging strategies will not resulting abrupt changes in aggregate demand which can potentially destabilize grid operations. Therefore, a centralized controller monitors the aggregated demand fluctuations based in the communications with utilities and energy providers regarding the energy price and availability.

The developed centralized controller receive feedback from utilities and energy providers regarding the energy price and availability and inform the algorithm regarding the updated values for online charging schedule algorithm.

The offline charging schedule optimization problem can be summarized as follow:

minimize $F_m$ $\forall m \in M$ subject to:

$$F_m = \sum_{\tau \in \Gamma} e(L_\tau(P_m)).P_m(\tau) + \delta(P_m(\tau) - \bar{P}(\tau))^2$$

$$P_m(\tau) = \begin{cases} 0 \leq P_m(\tau) \leq P_m^{max} & \text{if } \tau \in [\tau_m^{start}, \tau_m^{end}] \\ 0 & \text{otherwise} \end{cases}$$

$$P_m = \frac{B_m(SoC_m(\Gamma) - SoC_m(0))}{\eta_{B_m} \cdot \Delta\Gamma}$$

$$\sum_{\tau \in \Gamma} P_m(\tau) = P_m \quad \forall m \in M$$

Therefore, the collection of all the optimized power rates, $L(P)=(P_1, \ldots, P_M)$, is the main output of the offline charging scheduling optimization problem.

Electric Vehicle Supply Equipment

An EVSEs infrastructure recommendation seeks to minimize the total cost of EVSEs while meeting the minimum charging rate, which is the total estimated required average power. On the other hand, the total estimated required average power per EV determines the minimum charging rate of each port. As Equation (5) indicates, selected EVSEs' port must be able to provide the estimated required average power per EV.

In the first step, the maximum required power of each EV can be determined by finding the maximum power during the charging scheduling horizon. This indicates that each EV is needed to be charged by a charger port which its minimum capacity is equal to $P_m^{required}$. It should be noted that reserved or backup power can be also added to the minimum required power of each EV.

$$P_m^{required} = \max(P_m) \forall m \in M$$

For instance, if 10% back up power is required, $P_m^{required}=1.1*\max(P_m)$ for EV id m.

It should be noted that the proposed algorithm recommends required chargers and ports based on the obtained optimal power rates for the total electrified vehicle at the end of planning horizon. Due to the major costs of infrastructure upgrades, all the requirements for all the required power infrastructure will be initially considered. For example, if 10 EVs will be adopted in two years, the site already has enough capacity for quick installation of the chargers in two years.

A more formal expression of this procedure is given by the following algorithm:

EVSE Optimization Algorithm

Step 1: Determine the maximum required power for each EV based on the obtained optimal power rates.

Step 2: Consider adding back up or reserved power to respond to deviation from the optimal charging schedule.

Step 3: For each point of time from $\tau=0, 1, \ldots, \Gamma$, for each EV, track the number of chargers which are required to be added or idle at.

For each time interval:
  For each EV:
    If a charger port with enough power is available:
      Track that charger as idle till departure of that EV
    Else if a charger port with enough power is not available:
      Add that charger port to the required charger port list.

PredictEV Fleet tool has access to the EVSE Database to recommend the optimized combination of the charging stations based on the maximum continuous draw (amps), rated power, total cost, and grid restrictions. Equations (6) and (6.a) present the main objective function and cost constraints that try to minimize the total cost of charging stations including the capital, installation, and maintenance costs. There is no time index for charging stations since it has been assumed that all the required amount of energy during the optimization horizon is considered once charger infrastructure recommendations are provided. In other words, no infrastructure update will take place during the optimization horizon. Equations (6.b) and (6.c) determine the minimum requested numbers of chargers of type j by user and the maximum possible numbers determined based on grid capacity or restrictions. It should be noted that $N_j^{Min,Station}$ is the output of abovementioned algorithm which determines the minimum number of port for each required power.

Minimize $TC^{EVSE}$ (6)

$TC^{EVSE} = \sum_{j=1}^{J} N_j^{Station}(C_j^{Station} + I_j^{Station} + M_j^{Station})$ (6.a)

$N_j^{Station} \geq N_j^{Min,Station} \forall j$ (6.b)

$N_j^{Station} \leq N_j^{Max,Station} \forall j$ (6.c)

$N_j^{Station} \in \{ \mathbb{Z}^+ \text{(positive integer)}\} \forall j$ (6.e)

Online Charging Solutions

All the presented sub-problems up to this point are generally directed toward providing one-time recommendations on electrification, charging schedule, and charging infrastructure. Another sub-problem seeks to enhance the application of the PredictEV tool by providing real-time charging scheduled recommendations based on the 1) updated shift time and travel distance information and 2) electricity price profiles.

An online charging solution provides the optimized power rate for each of the EVs based on the developed optimization function for an offline charging solution. As stated in the offline charging scheduling session, some degree of flexibility can be added to the power profiles to deviate from the optimal offline schedule. Any violation from the allowable deviation will cause the infeasibility of the recommended solutions. The following equation indicates that power rate at each interval is restricted by the minimum of the maximum power rate of battery and the power of the charger assigned to EV.

$$P_m(\tau) = \begin{cases} 0 \leq P_m(\tau) \leq \min(P_m^{max}, P_m^{charger}) & \text{if } \tau \in [\tau_m^{start}, \tau_m^{end}] \\ 0 & \text{otherwise} \end{cases}$$

Online charging solution assumes each EV will always receive charge from the same chargers determined in offline section.

Once the number of EVs and EVSEs are determined, charging sessions can be recommended to minimize the demand charges and shave the peak of the demand. ESSs can store electrical energy over a period of time and release it back to the network once the prices are higher or enough power is not available. To reduce demand charge spikes and have a reliable power supply, power can be reserved in ESSs. In these cases, ESSs usually draw power from a separate source of energy, such as solar Photovoltaic (PV) panels, or at a time when electricity prices are low. These strategies reduce the fleet's exposure to unexpected energy prices and power disruptions. Batteries are the most common form of ESSs, which are available in a different range of capacities. Depending on the load profile, selected EVSE options, and level of power supply, batteries may be a valuable option to explore. Adoption of the batteries becomes more important in the case of renewable energy resources integration since they are intermittent in nature.

Demand response is a change in the power consumption of a customer to improve the balance of the power demand and supply. Demand response seeks to regulate the demand for power instead of adjusting the supply. Utilities may signal demand requests to their customers in different ways, including simple off-peak metering, in which power is cheaper at certain times of the day, and smart metering, in which explicit requests or changes in electricity price can be communicated to customers. The customer may adjust power demand by deferring some tasks that require large amounts of electric power or may decide to pay a higher price for their electricity. Therefore, demand response programs can highly affect the schedules for charging sessions. Once the fleet yard is enrolled in a demand response program, PredictEV fleet can optimize the charging recommendations of the EVs based on the communications signals received from utilities.

ELECTRIFICATION and EVSE RECOMMENDATIONS

Assume a fleet yard is interested in electrifying its ICE vehicles, which include 50 Ford Fusions and 10 Ford F150s. This fleet yard does not have any budget constraints. As FIG. 4A presents, Ford Fusions and Ford F150s are replaced with Nissan Leafs and Rivian RITs at the current moment. It should be noted that no budgeting or market inventory restrictions are applied for this specific example.

FIG. 4B presents the Total Cost of Ownership (TCO) analysis broken down into Energy, Operation Expenditure (OPEX), and Capital Expenditure (CAPEX). In this example, it has been assumed that all the vehicles are following a same operational schedule and there are no onsite fleet operators to plug and unplug the chargers from the EVs. Furthermore, based on their travel information for each shift, there are some practical charging time windows which all require to receive power from the charger. Consequently, 60 Level 2, 7 kW ports are recommended. Obviously, the recommended set of ports will provide the minimized energy cost to charge the EVs. It should be noted there is no one to one assignment between the EVs and ports. Indeed, it depends on the shift schedules and the required energy at each period of time. It is possible to charge 60 EVs by only 10 chargers, as an example, if the operation time and travel distance allow and a fleet operator exist to take care of plugging and unplugging the vehicles. An example EVSE recommendation is shown in FIG. 4C.

Illustrative Example—Peak of Daily Energy Demand

The purpose of this example is to show the effect of the required number of charging sessions for different types of EVs or EVs with different distances traveled. As FIG. 4A presents, the peak of the daily energy demand must be considered for the charging stations infrastructure. Assume a fleet has 85 EVs with the following charging schedules: 40 EVs require charging every day, 30 EVs require charging every other day, 15 EVs require charging every three day.

Figure 4D:
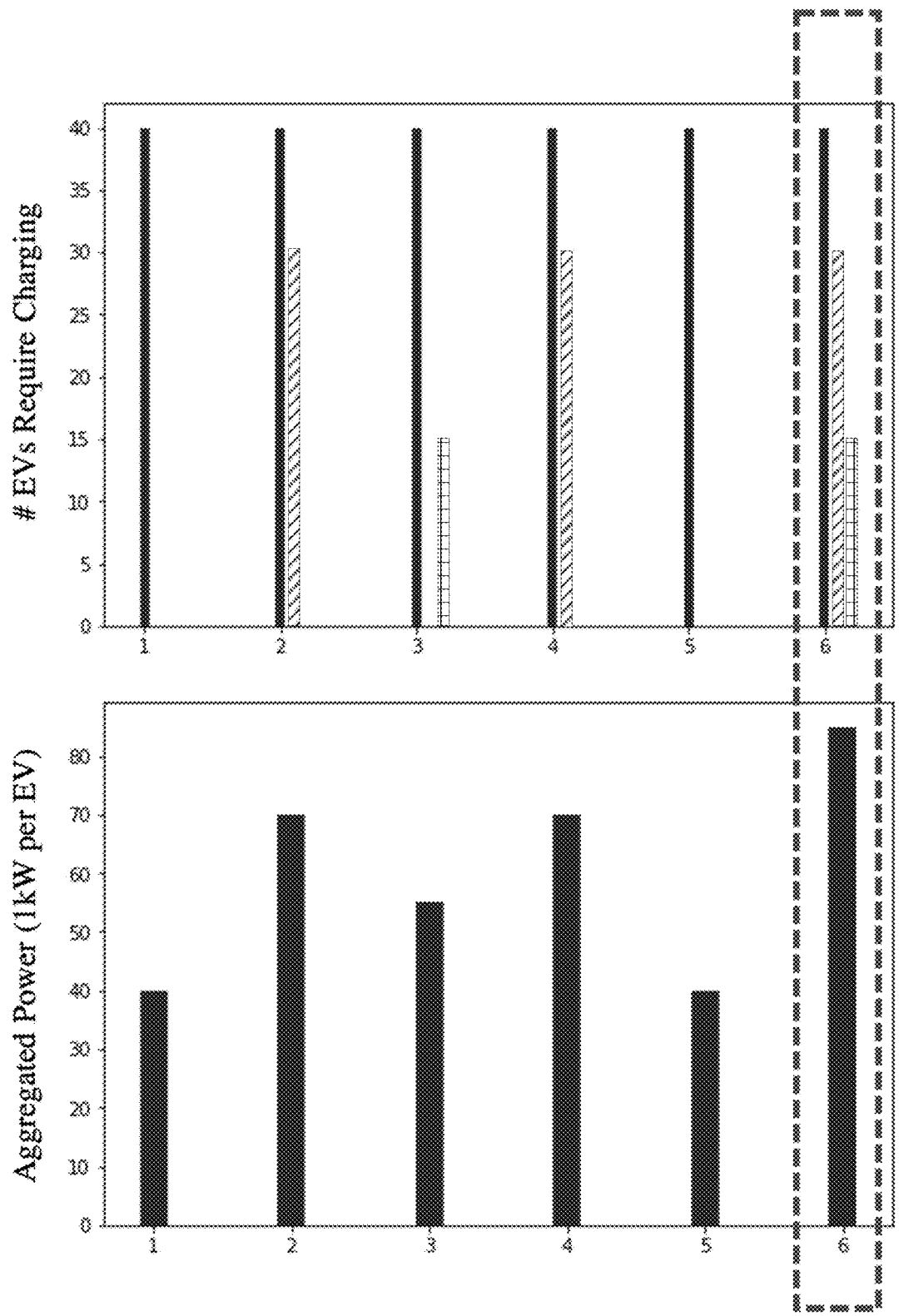
FIG. 4D is a diagram illustrating example peak daily energy demand from a vehicle fleet.

As FIG. 4D presents, the peak of the daily energy demand is for the days which all the EVs require charging sessions. It should be noted that they may not have the same practical charging window but, in this example, it has been assumed that all of them return and release from the fleet yard at the same time. The main purpose of this example is to depict the peak of the energy demand which must be considered to design charging infrastructure.

Illustrative Example—EVSE Upgrade

Figure 5:
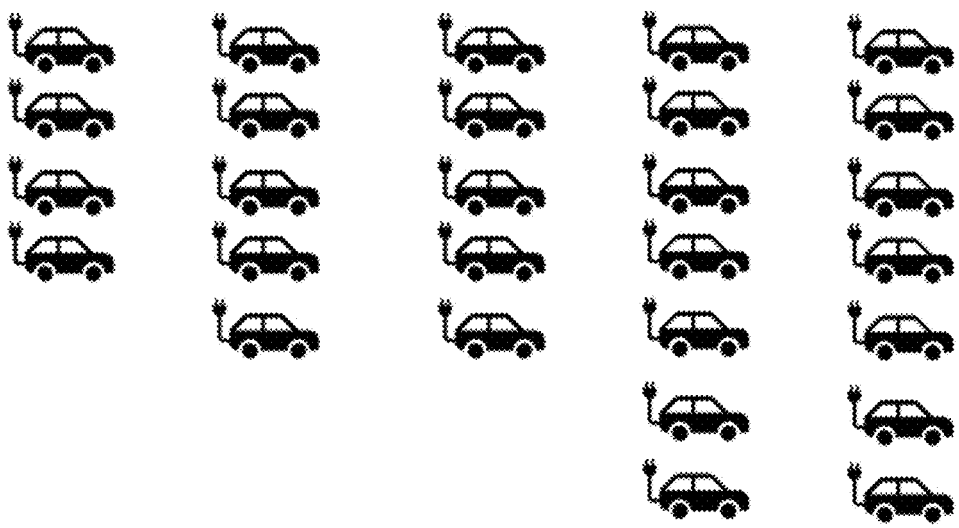
FIG. 5 is a diagram that presents an example EVSE infrastructure recommendation over a 5-year optimization horizon, according to an embodiment.
Figure 5:
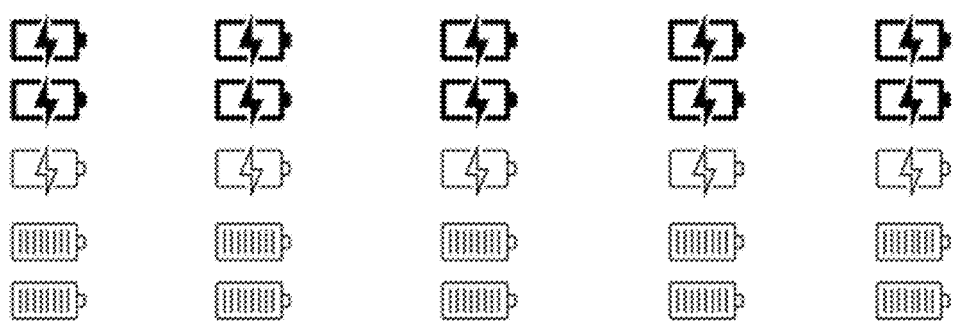

Based on the rapid technological changes in the area of EV and EVSE, the horizon of the PredictEV Fleet optimization problem is expected to be short, up to a few years. Although, PredictEV fleet algorithm can provide recommendations on EVSE infrastructure upgrade, it has been assumed that upgrade will not take place during the optimization horizon Consequently, EVSE infrastructure recommendation must be based on the peak of the number of EVs that exist in the fleet. FIG. 5 presents an example of EVSE infrastructure recommendation over 5 years of optimization horizon, which is based on the projected maximum number of EVs that exist in a fleet.

Illustrative Example—Energy Demand Estimation—Warm Start

The purpose of this example is to estimate the total average required power for a simple scenario as follows:
A fleet has a total of 50 EVs and all of them are the same.
EVs return to the fleet yard by 6 p.m. and must be ready to depart by 4 a.m.
EVs return to the fleet yard by 6 a.m. and must be ready to depart by 11 a.m.
EVs are available for charging 80% of the charging window.
All EVs travel 100 Miles after each charging session.
All EVs have 0.7 kWh of energy usage per mile.
All EVs have one assigned task each day.
The total average required energy must be calculated for each of the shifts separately. It should be noted that there is no overlap between the two shifts in this example.

$$E_{shift1}\left(\frac{kWh}{Day}\right) = 30(Evs) * 100\left(\frac{Miles}{Day}\right) * 0.7\left(\frac{kWh}{Mile}\right) = 2100 kWh$$

$$E_{shift2}\left(\frac{kWh}{Day}\right) = 20(Evs) * 100\left(\frac{Miles}{Day}\right) * 0.7\left(\frac{kWh}{Mile}\right) = 1400 kWh$$

Now, the total average required power must be calculated based on the practical charging window.

$$\bar{P}_{shift1} = \frac{2100 kWh}{10 h * 0.8} = 262.5 \text{ kW}$$

$$\bar{P}_{shift1} = \frac{1400 kWh}{5 h * 0.8} = 350 \text{ kW}$$

Therefore, the EVSE infrastructure must have the capability to provide 350 kW of power. It should be noted that the total average required power is estimated based on a uniformly distributed amount of power over the practical charging window. There is no need to keep all the vehicles connected to the charging ports all the time during the practical charging window. The next example presents different charging scenarios under the same total average required power and the same EVSE infrastructure.

Illustrative Example—Charging Solutions Scenarios

Figure 6A:
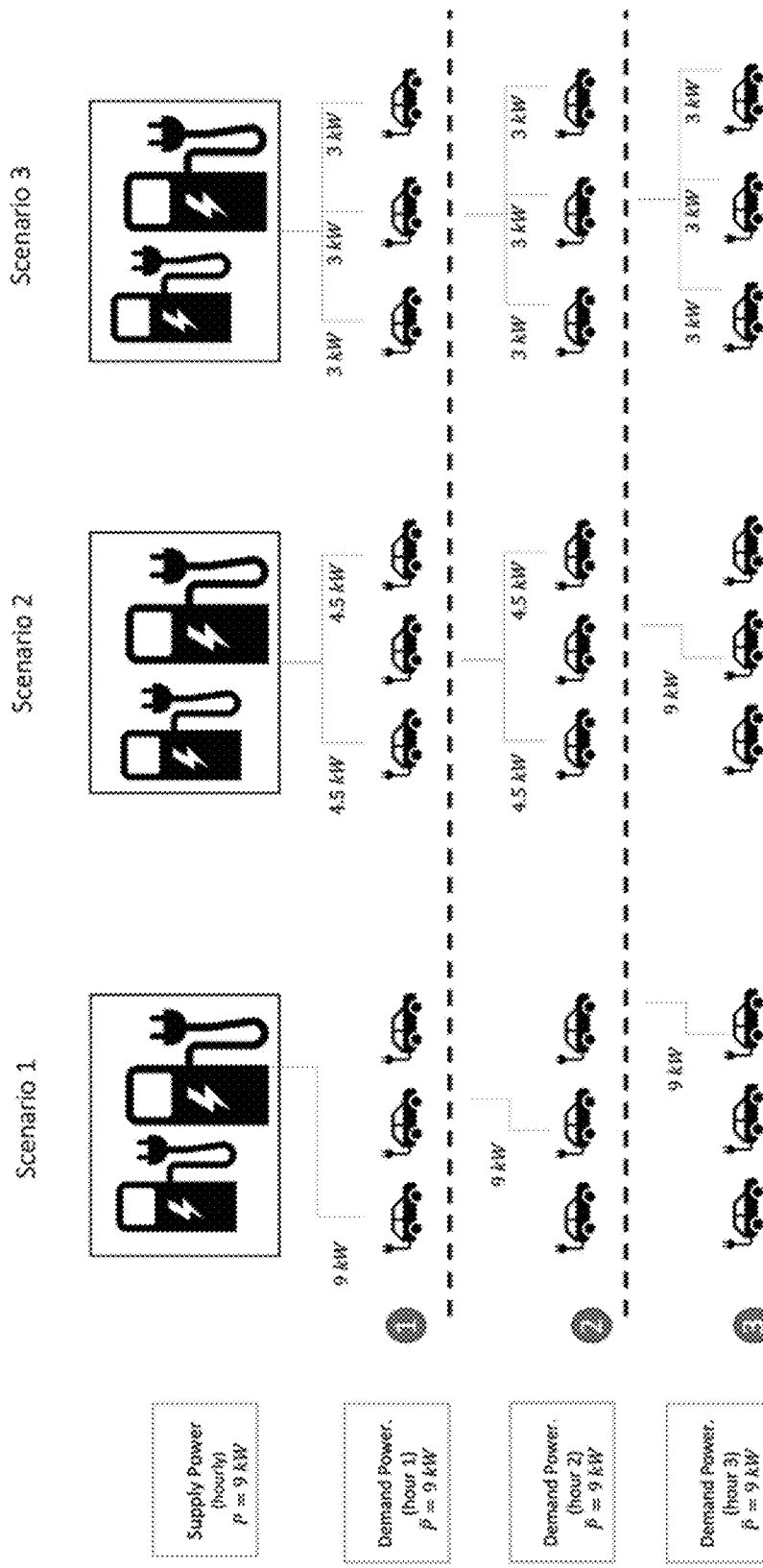
FIG. 6A is a diagram that presents example alternative charging configurations to meet a defined power demand using an existing EVCS charging infrastructure, according to an embodiment.

The purpose of this example is to explore different charging schedules under the same total average required power and same charging infrastructure. This indicates all the EVs should not necessarily be connected to the charging ports all the time. FIG. 6A presents an example of different charging solutions under the same power demand and charging infrastructure.

The practical charging window is 3 hours.
The average demand for power is 9 kW per hour.
Supply power can provide 9 kW per hour.
Fleet has 3 EVs and each needs 9 kWh of energy at the end of the charging window.

Illustrative Example—Charging Solutions—Valley-Filling

Figure 6B:
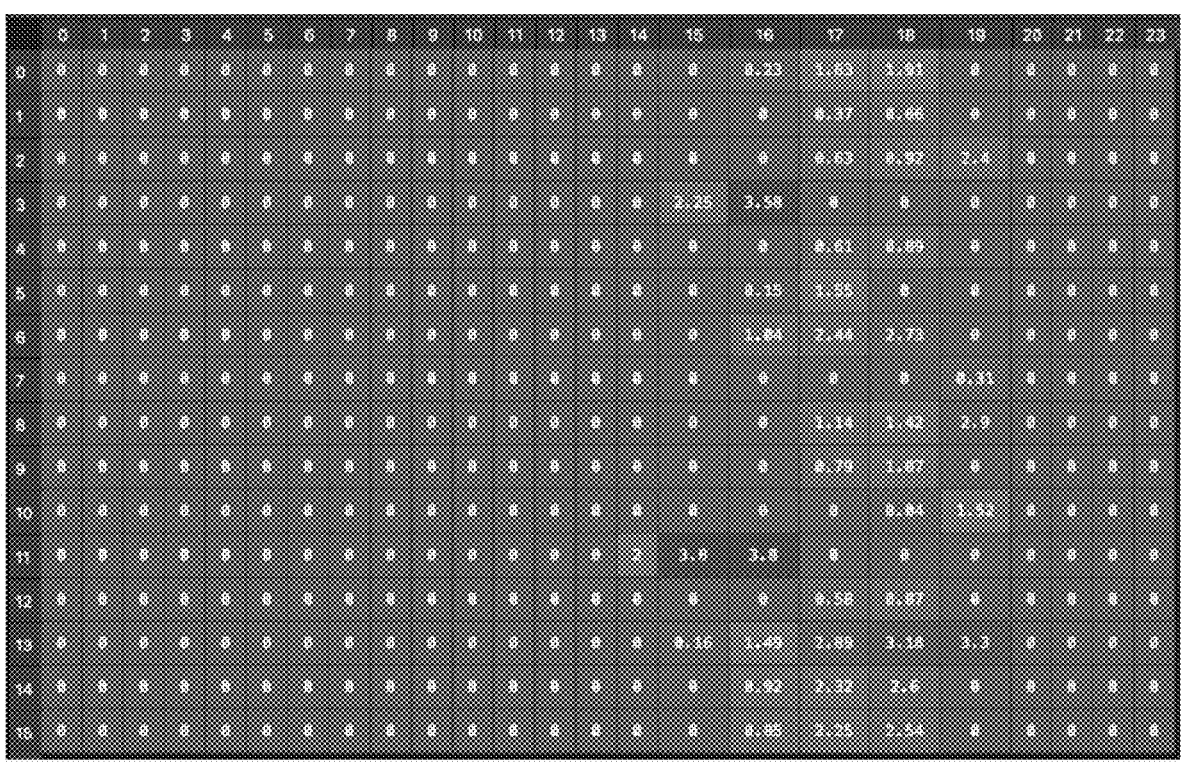
FIG. 6B is a diagram that presents optimized charging schedules based on valley filling and energy cost optimization objectives, according to an embodiment.

In this example, assume we have 16 EVs to charge and the practical charging window starts from 2:00 PM to 7:00 PM and all vehicles might not arrive at a same time. FIG. 6B presents optimized charging schedules based on valley filling and energy cost optimization objectives. It should be noted that more detailed information on the shift and vehicle specification have been used to provide charging recommendation.

Figure 6C:
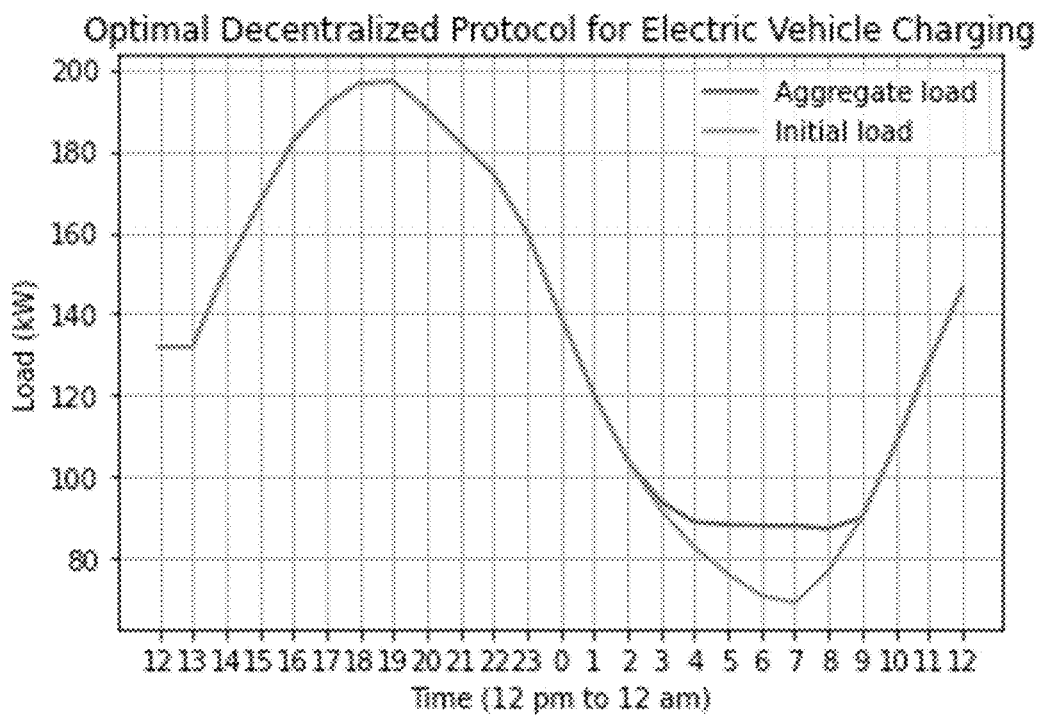
FIG. 6C is a diagram that presents graphs of example daily EV charging loads and electricity prices, and the use of valley filling to increase usage during lower cost off-peak hours.
Figure 6C:
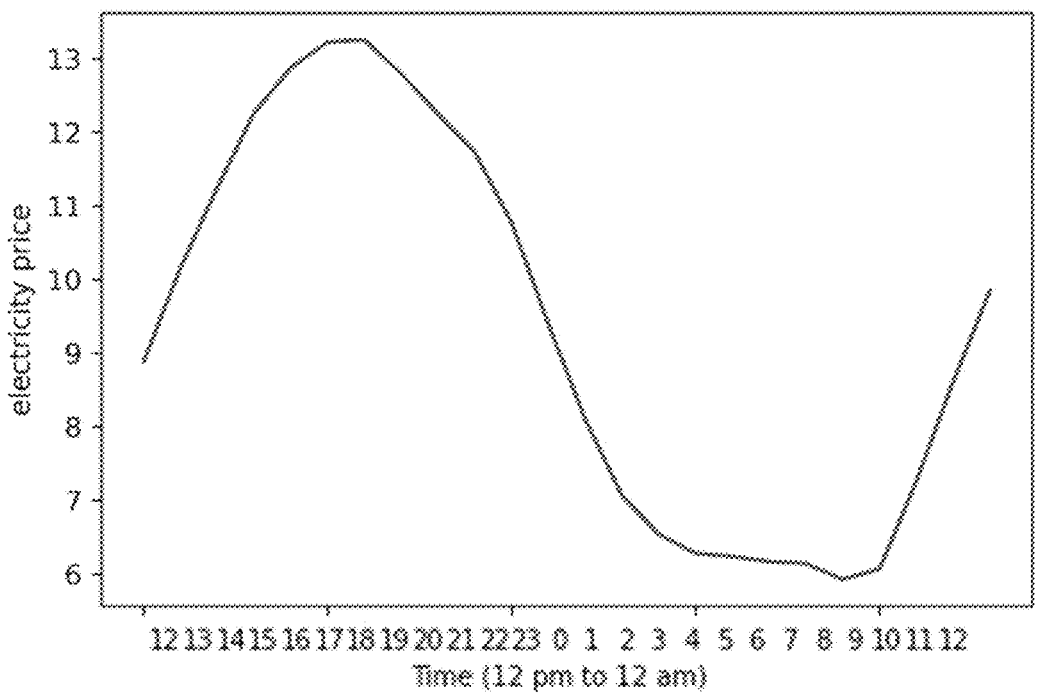

FIG. 6C presents the aggregated load for the area, from the utility side of view, and the EVs' load which filled the valley of the initial load to reduce the burden on the utility and minimize the energy cost by charging the EVs during the off-peak period while electricity price is lower. It should be noted that operations and shift restrictions might not always allow the fleet operators to charge during the off-peak periods. For these scenarios, the integration of the ESSs and DERs will significantly enhance the energy cost and grid stability. As mentioned above, PredictEV Fleet algorithm can also support ESSs and DERs integration.

Example Procedure

Figure 7:
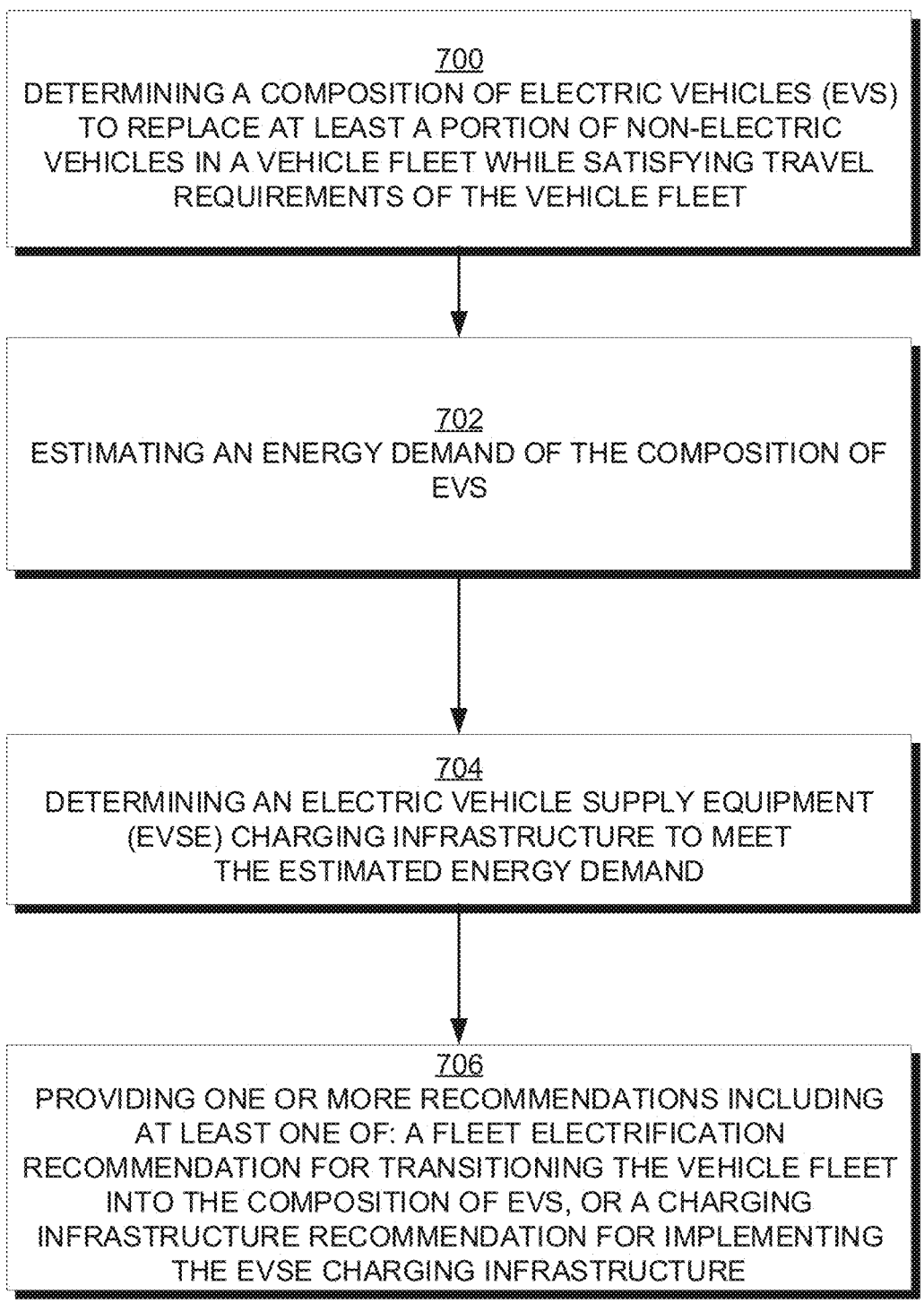
FIG. 7 is a flow diagram that illustrates steps to steps to perform fleet electrification management ("PredictEV Fleet"), according to an embodiment.
Figure 8:
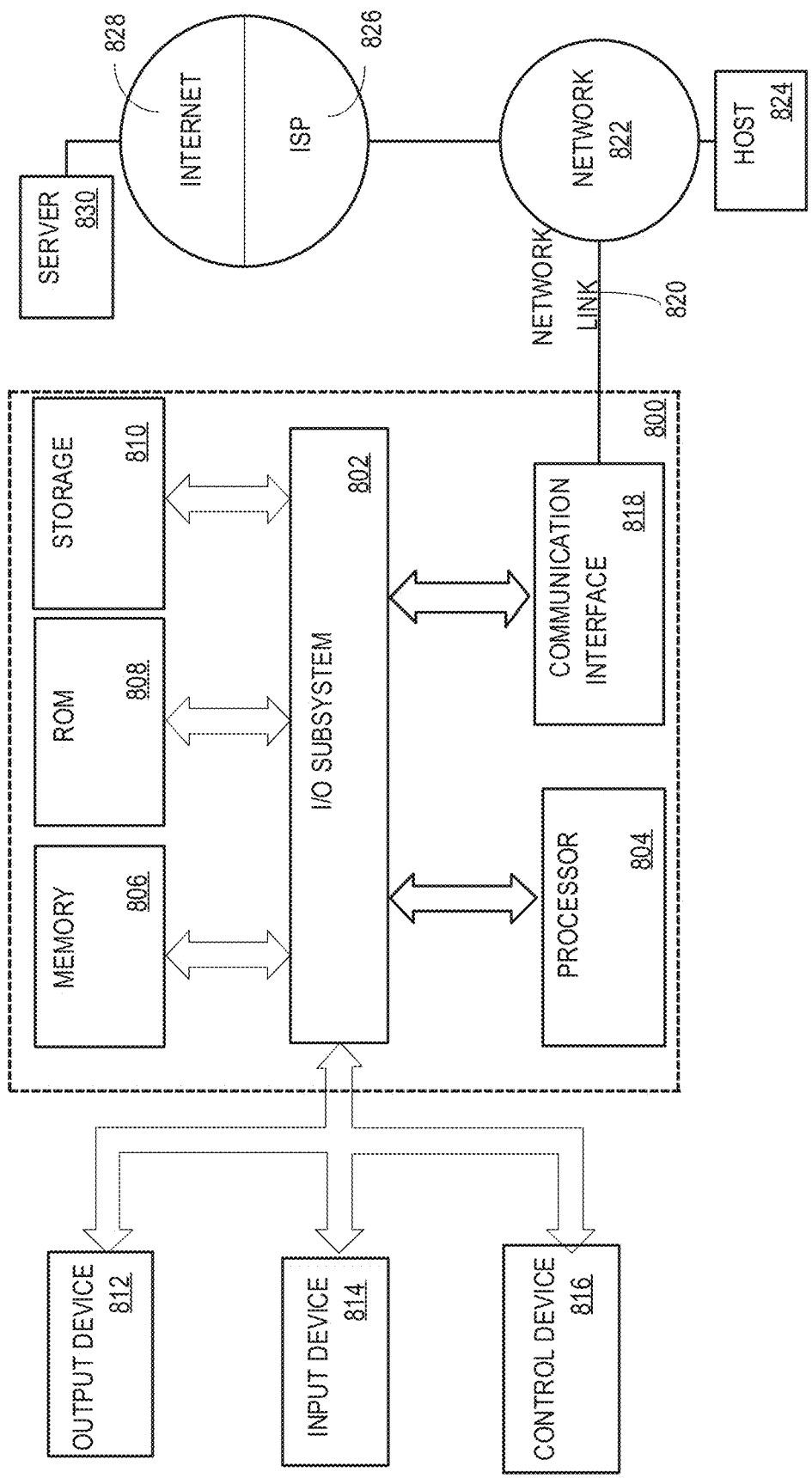
FIG. 8 is a block diagram of a computer system upon which the techniques described herein may be implemented.

Referring to FIG. 7, it is a flow diagram that illustrates steps to perform fleet electrification management ("PredictEV Fleet"), according to an embodiment.

At step 700, a composition of EVs are determined to replace at least a portion of non-electric vehicles in a vehicle fleet while satisfying travel requirements of the vehicle fleet. For example, as described above and shown in FIG. 2, a fleet EV composition optimization algorithm may provide a recommendation of EVs to replace existing non-EV or ICE vehicles in a current fleet based on various adjustable user inputs, including the travel requirements (e.g., based on average/max distance travelled for a defined time period) of the vehicle fleet.

At step 702, energy demand of the composition of EVs is estimated. For example, as described above and shown in FIG. 2, an EV charging solutions optimization algorithm may determine an energy demand of the composition of EVs determined in step 700, which may be based on a peak period of energy demand for the composition of EVs.

At step 704, an EVSE charging infrastructure is determined to meet the estimated energy demand from step 702. For example, as described above and shown in FIG. 2, an EVSE infrastructure optimization algorithm may be used to determine one or more alternative configurations to meet the energy demand from step 702.

At step 706, one or more recommendations are provided, which include at least one of: a fleet electrification recommendation for transitioning the vehicle fleet into the composition of EVs from step 700, or a charging infrastructure recommendation for implementing the EVSE charging infrastructure from step 704. As shown in FIG. 2, other recommendations may be provided as well, including charging scheduling recommendations, a capital/operational expenditure analysis, and a listing of environmental and social cost benefits or savings. The user may optionally adjust or override the parameters from the various databases or the user inputs to generate a new set of recommendations based on the user adjustments.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    determining, by a computerized system that comprises one or more processors, a composition of electric vehicles (EVs) to replace at least a portion of non-electric vehicles in a vehicle fleet while satisfying travel requirements of the vehicle fleet;
    estimating, by the computerized system, an average power demand of the composition of EVs based at least in part on a duration of a practical charging window, wherein the practical charging window corresponds to remaining time between consecutive shifts in which EVs are available to be charged;
    determining, by the computerized system, an electric vehicle supply equipment (EVSE) charging infrastructure to meet the estimated average power demand; and
    providing, by the computerized system, one or more recommendations including at least one of: a fleet electrification recommendation for transitioning the vehicle fleet into the composition of EVs, or a charging infrastructure recommendation for implementing the EVSE charging infrastructure.

2. The method of claim 1, wherein determining the composition of EVs is based on at least one of:
    a current composition of the vehicle fleet;
    minimizing a total cost of ownership for the vehicle fleet;

minimizing a total cost of charging for the vehicle fleet; or an electrification planning time horizon.

3. The method of claim 1, wherein the travel requirements of the vehicle fleet are based on at least one of:
an average distance traveled for a defined period;
a maximum distance travel for a defined period;
vehicle operation times;
vehicle shift information; or
vehicle dwell times.

4. The method of claim 1, wherein estimating the energy average power demand of the composition of EVs is further based on a peak period of energy demand, which is estimated based on a quantity of EVs in the composition of EVs and their charging demand during the practical charging window.

5. The method of claim 1, wherein the EVSE charging infrastructure is for multiple locations, and wherein the one or more recommendations are based on at least one of: vehicle routes, power availability, and fleet strategies.

6. The method of claim 1, wherein the one or more recommendations are based on at least one of:
energy storage systems (ESSs);
renewable energy resources (RERs);
energy price changes; or
energy load balancing.

7. The method of claim 1, wherein the charging infrastructure recommendation includes a plurality of alternative charging configurations to meet the estimated average power demand.

8. The method of claim 1, wherein the charging infrastructure recommendation includes a number and configuration of EVSE to be installed over a time horizon.

9. The method of claim 1, wherein the one or more recommendations further include a recommended schedule for charging the vehicle fleet.

10. The method of claim 1, wherein the one or more recommendations further include social or economic cost savings and benefits.

11. A system comprising:
one or more processors;
one or more storage devices operatively coupled to the processor;
instructions, stored on the one or more storage devices, which, when executed by the one or more processors, cause:
determining a composition of electric vehicles (EVs) to replace at least a portion of non-electric vehicles in a vehicle fleet while satisfying travel requirements of the vehicle fleet;
estimating an average power demand of the composition of EVs based at least in part on a duration of a practical charging window, wherein the practical charging window corresponds to remaining time between consecutive shifts in which EVs are available to be charged;
determining an electric vehicle supply equipment (EVSE) charging infrastructure to meet the estimated average power demand; and
providing one or more recommendations including at least one of: a fleet electrification
recommendation for transitioning the vehicle fleet into the composition of EVs, or
a charging infrastructure recommendation for implementing the EVSE charging infrastructure.

12. The system of claim 11, wherein determining the composition of EVs is based on at least one of:
a current composition of the vehicle fleet;
minimizing a total cost of ownership for the vehicle fleet;
minimizing a total cost of charging for the vehicle fleet; or
an electrification planning time horizon.

13. The system of claim 11, wherein the travel requirements of the vehicle fleet are based on at least one of:
an average distance traveled for a defined period;
a maximum distance travel for a defined period;
vehicle operation times;
vehicle shift information; or
vehicle dwell times.

14. The system of claim 11, wherein estimating the average power demand of the composition of EVs is further based on a peak period of energy demand, which is estimated based on a quantity of EVs in the composition of EVs and their charging demand during the practical charging window.

15. The system of claim 11, wherein the EVSE charging infrastructure is for multiple locations, and wherein the one or more recommendations are based on at least one of: vehicle routes, power availability, and fleet strategies.

16. The system of claim 11, wherein the one or more recommendations are based on at least one of:
energy storage systems (ESSs);
renewable energy resources (RERs);
energy price changes; or
energy load balancing.

17. The system of claim 11, wherein the charging infrastructure recommendation includes a plurality of alternative charging configurations to meet the estimated average power demand.

18. The system of claim 11, wherein the charging infrastructure recommendation includes a number and configuration of EVSE to be installed over a time horizon.

19. The system of claim 11, wherein the one or more recommendations further include a recommended schedule for charging the vehicle fleet.

20. The system of claim 11, wherein the one or more recommendations further include social or economic cost savings and benefits.

* * * * *